(12) United States Patent
Helber et al.

(10) Patent No.: US 10,268,783 B2
(45) Date of Patent: Apr. 23, 2019

(54) SYSTEM AND METHOD FOR CORRECTING A MODEL-DERIVED VERTICAL STRUCTURE OF OCEAN TEMPERATURE AND OCEAN SALINITY BASED ON SEA SURFACE HEIGHT OBSERVATIONS

(71) Applicants: Robert W. Helber, Slidell, LA (US); Scott R. Smith, Slidell, LA (US); Gregg Arthur Jacobs, Slidell, LA (US)

(72) Inventors: Robert W. Helber, Slidell, LA (US); Scott R. Smith, Slidell, LA (US); Gregg Arthur Jacobs, Slidell, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 746 days.

(21) Appl. No.: 14/522,570

(22) Filed: Oct. 23, 2014

(65) Prior Publication Data
US 2016/0117423 A1    Apr. 28, 2016

(51) Int. Cl.
| | | |
|---|---|---|
| G06F 17/50 | (2006.01) | |
| G06F 17/16 | (2006.01) | |
| G01W 1/10 | (2006.01) | |
| G01V 11/00 | (2006.01) | |

(52) U.S. Cl.
CPC .......... *G06F 17/5009* (2013.01); *G06F 17/16* (2013.01); *G01V 11/00* (2013.01); *G01W 1/10* (2013.01); *G06F 2217/16* (2013.01); *Y02A 90/16* (2018.01)

(58) Field of Classification Search
None
See application file for complete search history.

(56) References Cited

U.S. PATENT DOCUMENTS

| | | | | |
|---|---|---|---|---|
| 2010/0082264 A1* | 4/2010 | Barron | ..................... | G01K 7/42 702/25 |
| 2013/0158874 A1* | 6/2013 | Helber | ................... | G06Q 10/00 702/5 |
| 2014/0278314 A1* | 9/2014 | Jacobs | ................ | G06F 17/5009 703/9 |

OTHER PUBLICATIONS

Oke, P.R., J. S. Allen, R. N. Miller, G. D. Egbert, and P. M. Kosro, (Sep. 10, 2002) Assimilation of surface velocity data into a primitive equation coastal ocean model. J. Geophys. Res., 107, 3122, doi:10.1029/2000JC000511.

Oke, P.R., A. Schiller, D.A. Griffin, and G.B. Brassington, (Nov. 8, 2005) Ensemble data assimilation for an eddy-resolving ocean model of the Australian region, Q. J. R. Meteorol. Soc., 131, pp. 3301-3311.

(Continued)

*Primary Examiner* — Craig C Dorais
(74) *Attorney, Agent, or Firm* — US Naval Research Laboratory; William P. Ladd (57) ABSTRACT

System and method for correcting the vertical structure of the ocean temperature and salinity can enable the use of sea surface height (SSH) measurements to correct ocean forecast models. In the present embodiment, three relations that can be precomputed are exploited: (1) the relation between temperature and salinity throughout a water column, (2) the relation between temperature/salinity and geopotential, and (3) the relation between geopotential and SSH. The relations are stored in a form that allows efficient application through a cross-correlation matrix.

20 Claims, 7 Drawing Sheets
(3 of 7 Drawing Sheet(s) Filed in Color)

(56) References Cited

OTHER PUBLICATIONS

Kurapov, A.L., D. Foley, P. T. Strub, G. D. Egbert, and J. S. Allen, "Multivariate covariance is provided by the dynamical model [Bennett, 2002]" for along-track data assimilation: (May 14, 2011) Variational assimilation of satellite observations in a coastal ocean model off Oregon, 116, C05006, doi:10.1029/2010JC006909.

Fox, D.N., C.N. Barron, M.R. Carnes, M. Booda, G. Peggion, and J. Van Gurley, (2002) The Modular Ocean Data Assimilation System, Oceanography, 15, pp. 22-28.

Helber R. W., T.L. Townsend, C.N. Barron, J.M. Dastugue, and M.R. Carnes, (Mar. 15, 2013) Validation Test Report for the Improved Synthetics Ocean Profile (ISOP) System, Part I: Synthetic profile Methods and Algorithm, NRL/MR/7320-13-9364, pp. 120.

\* cited by examiner

SYSTEM AND METHOD FOR CORRECTING A MODEL-DERIVED VERTICAL STRUCTURE OF OCEAN TEMPERATURE AND OCEAN SALINITY BASED ON SEA SURFACE HEIGHT OBSERVATIONS

CROSS-REFERENCE TO RELATED APPLICATIONS

The present application is related to U.S. patent application Ser. No. 14/023,030, filed on Sep. 10, 2013, entitled System and Method for Correcting a Model-Derived Vertical Structure of Ocean Temperature and Ocean Salinity Based on Velocity Observations, incorporated herein by reference in its entirety.

BACKGROUND

Methods and systems disclosed herein relate generally to correcting numerical models and more specifically to using sea surface height (SSH) data to correct ocean forecast models.

Systems exist that enable velocity observations of ocean currents from sources such as drifters at the surface or under water, and/or current meters either moored or on ships, to correct an ocean forecast model by using historical observations saved in a database to relate the observed velocity to temperature and salinity structure throughout the water column. These systems relate velocity measurements to salinity and temperature using historical observations, and enable the use of a plethora of existing, worldwide sources, for example, but not limited to, drifters and current meters, of current measurements for ocean model correction. These systems make use of existing historical data to develop region specific velocity/salinity-temperature correlations, and are computationally efficient and compatible with existing super-computer ocean forecasting systems operated daily to enable operational use.

SSH is a measure of the difference between the actual SSH at any given time and place, and that which it would have if the ocean were at rest. Satellite altimeters measure the round-trip travel time of a radar pulse to estimate SSH. Ocean forecast model corrections have historically been done using salinity and temperature profiles and satellite SSH. Another method for using SSH to correct ocean models uses data assimilation through the construction of synthetic ocean profiles. This method can be inefficient, can introduce representativeness errors, and can potentially damp out information from profile observations. Yet another method uses data assimilation through model-derived error covariances according to Eq. (1).

$$\langle (x - \langle x \rangle)(x - \langle x \rangle)^T \rangle = \begin{bmatrix} U_T B_T U_T^T & 0 \\ 0 & U_S B_S U_S^T \end{bmatrix} \quad (1)$$

where $x^T = [T_1 \ldots T_N, S_1 \ldots S_n]$, T=Temperature, S=Salinity
n=number of vertical levels
< >=average operator
$U_{T\ or\ S}$=vector of standard deviations for T or S
$B_{T\ or\ S}$=correlation matrix for T or S
This method can lead to undesirable model self-confirmation effects. Ocean data assimilation systems require a method to correlate observations at two vertical locations in the ocean.

What is needed is a system that enables SSH measurements from sources such as satellites to correct an ocean forecast model by using historical observations saved in a database to relate the observed SSH to temperature and salinity structure throughout the water column. The needed system could enable the use of a plethora of existing, worldwide sources of SSH for ocean model correction. The needed system could make use of existing historical data to develop region-specific SSH/salinity-temperature correlations. What is further needed is a computationally efficient method that is compatible with existing super-computer ocean forecasting systems operated daily to enable operational use. What is still further needed is a system that allows the direct assimilation of SSH data from satellites to improve efficiency and reduce representativeness errors. What is even still further needed is historical observation data to provide the relations between T, S, and geopotential (ø) to prevent errors due to model drift in ensemble methods.

SUMMARY

The system and method of the present embodiment can enable the use of SSH measurements to correct ocean forecast models. In the present embodiment, two relations that can be precomputed are exploited: (1) the relation between temperature and salinity throughout a water column, and (2) the relation between temperature/salinity and geopotential. Further, it is recognized that surface geopotential equals the sea surface height. The relations are stored in a form that allows efficient application through a cross-correlation matrix. In the present embodiment, historical observations can be used to construct the relation between T and S variations throughout the water column. The cross-correlation between T and S and ø, the height change of constant pressure surfaces, can be computed. Geopotential ø is computed through specific volume expansion of the fluid below a given depth due to T and S variations, except at the ocean surface where geopotential ø is equal to SSH. For example, as temperature increases in lower water, the lower water expands. The position of geopotential (constant pressure) moves upward due to volume expansion. The cross-correlation matrix between T and S and ø is decomposed through an eigenvector reduction, and the most significant modes are retained. Thus, given geopotential at any depth and the SSH, the relation to T and S within the water column is known. Historical observations can provide the relations between ø and T/S, which can prevent errors due to model drift in previously available methods. Using the system and method of the present embodiment, model increments for SSH observations now have the appropriate subsurface response. The system and method of the present embodiment do not require synthetic profiles, and allow the direct assimilation of SSH data from satellites, making it possible to make corrections to predictions in locations that were not possible to correct through the use of systems of the prior art.

The computer system of the present embodiment for correcting a grid of predicted ocean temperature and ocean salinity in a water column based on sea surface height observations can include, but is not limited to including, a correlations processor that can compute, by a special purpose computer, vertical correlations between historical temperature values and historical salinity values at various depths. The historical temperature vertical profiles have historical temperature values at the various depths, and the historical salinity vertical profiles have historical salinity values at the various depths. The various depths are selected from depths between a pre-selected lowest depth to the ocean surface. The computer system can also include a variability processor that can compute, by the special purpose computer, significant vertical variability of the temperature vertical profiles and significant vertical variability of the salinity vertical profiles based on an empirical orthogonal function (EOF) analysis of the historical temperature vertical profiles and the historical salinity vertical profiles. The variability processor can also compute significant vertical variability of specific volume anomaly vertical profiles based on the significant vertical variability of the temperature vertical profiles and the significant vertical variability of the salinity vertical profiles. The specific volume anomaly vertical profiles include specific volume anomaly values. The variability processor can further compute significant vertical variability of geopotential vertical profiles based on the significant vertical variability of specific volume anomaly vertical profiles. The geopotential vertical profiles include geopotential values. The computer system can even still further include a standard deviation processor that can compute, by the special purpose computer, temperature standard deviations of temperature values and salinity standard deviations of salinity values. The standard deviation processor can also compute specific volume anomaly standard deviations of specific volume anomaly values based on the temperature standard deviations and the salinity standard deviations, and geopotential standard deviation of the geopotential values based on the specific volume anomaly standard deviations. The computer system can also include a correction processor that can modify, by the special purpose computer, the geopotential values to incorporate sea surface height (SSH) observations at the ocean surface. The correction processor can also compute covariances based on the vertical correlations, the temperature standard deviations, the salinity standard deviations, and the geopotential standard deviations. The corrections processor can also correct the grid of predicted ocean temperature and predicted ocean salinity based on the covariances and the modified geopotential values. The corrections processor can optionally include computer code that can produce a matrix of eigenvectors based on decomposing the vertical correlations through eigenvalue decomposition, store a set of most significant eigenvectors of the matrix of eigenvectors, the set being sized up to a pre-selected value, and reconstruct the vertical correlations based on the set of most significant eigenvectors, the temperature standard deviations, the salinity standard deviations, and the geopotential standard deviations. The computer system can optionally include a numerical model processor executing a numerical ocean prediction model using the corrected grid to produce a numerical model forecast and predict locations of eddies based on the numerical model forecast, or predict locations and strengths of ocean gradients based on the numerical model forecast, or provide mission management based on the predicted locations and strengths of ocean gradients.

A computer method for correcting a grid of predicted ocean temperature and ocean salinity based on sea surface height observations can include, but is not limited to including, determining historical temperature vertical profiles and historical salinity vertical profiles at various depths from a pre-selected lowest depth to the ocean surface. The historical temperature vertical profiles include temperature values, and the historical salinity vertical profiles include salinity values. The computer method can also include computing, by a special purpose computer, vertical correlations between the historical temperature values and the historical salinity values between the various depths, and computing, by the special purpose computer, temperature standard deviations of temperature values and computing salinity standard deviations of salinity values. The computer method can also determine, by the special purpose computer, significant vertical variability of the temperature vertical profiles and significant vertical variability of the salinity vertical profiles based on an empirical orthogonal function (EOF) analysis, and can compute, by the special purpose computer, significant vertical variability of specific volume anomaly vertical profiles based on the significant vertical variability of the temperature vertical profiles and the significant vertical variability of the salinity vertical profiles. The specific volume anomaly vertical profiles include specific volume anomaly values. The computer method can still further compute, by the special purpose computer, specific volume anomaly standard deviations of specific volume anomaly values from the temperature standard deviations and the salinity standard deviations, and can compute, by the special purpose computer, significant vertical variability of geopotential vertical profiles based on the significant vertical variability of the specific volume anomaly vertical profiles. The geopotential vertical profiles include geopotential values. The computer method can also compute, by the special purpose computer, geopotential standard deviation of the geopotential values based on the specific volume anomaly standard deviations, and can modify, by the special purpose computer, the geopotential values to incorporate sea surface height (SSH) observations at the ocean surface. The computer method can also compute, by the special purpose computer, covariances based on the vertical correlations, the temperature standard deviations, the salinity standard deviations, and the geopotential standard deviations, and can correct, by the special purpose computer, the grid of predicted ocean temperature and predicted ocean salinity based on the covariances and the modified geopotential values.

The computer method can optionally produce a matrix of eigenvectors based on decomposing the vertical correlations through eigenvalue decomposition, tore a set of most significant eigenvectors of the matrix of eigenvectors, the set being sized up to a pre-selected value, and reconstruct the vertical correlations based on the set of most significant eigenvectors, the temperature standard deviations, the salinity standard deviations, and the geopotential standard deviations. The computer method can further optionally execute a numerical ocean prediction model using the corrected predicted temperature and the corrected predicted salinity to produce a numerical model forecast, and predict location of eddies based on the numerical model forecast, or predict locations and strengths of ocean gradients based on the numerical model forecast, or provide mission management based on the predicted locations and strengths of ocean gradients.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

DETAILED DESCRIPTION

The problems set forth above as well as further and other problems are solved by the present teachings. These solutions and other advantages are achieved by the various embodiments of the teachings described herein below.

The system and method of the present embodiment can correct ocean temperature and salinity structure given SSH observations. The correction constructed uses historical in situ observations to first compute the covariance of temperature and salinity throughout the water column, and then extends the covariance to relate temperature and salinity to geopotential, modifies the geopotential information to include SSH observations, and relates the covariance of modified geopotential to temperature and salinity via the reverse application of the constructed covariances. The relation between geopotential and subsurface temperature and salinity has not been constructed previously from in situ SSH observations, and thus it has not been possible for SSH observations to influence the temperature and salinity structure as historically observed. A derivation of the system and method of the present embodiment is given below.

The system and method of the present embodiment use the fact that SSH is the geopotential at the surface. The derivation starts by computing the cross covariance of geopotential ø, temperature T, and salinity S. Geopotential anomaly is related to T and S by integrating the specific volume anomaly from a reference level to depth z. Pressure is an integral of density multiplied by gravitational acceleration above a particular depth. The fixed vertical position is translated to a fixed parcel of material. The total mass above this fixed parcel of material is constant regardless of the variation in specific volume either below or above this parcel. Thus the pressure is constant when following this material parcel. The geopotential height is the height of this parcel that represents a particular pressure, and, at the ocean surface, the geopotential is equal to the SSH. To determine how this parcel of fixed pressure moves vertically, it is only necessary to consider the specific volume anomaly beneath the parcel. Thus, the geopotential height anomaly (height of a particular pressure level due to deviations in T and S from 0° C. and thirty-five parts per thousand, respectively) is determined by the specific volume anomaly δ(z) integrated from the ocean bottom to the pressure level of the parcel prior to displacement. Given that the T and S variation is assumed to be 0 below a reference level, geopotential ø can be expressed as a vertical integral from the reference level to a specified depth:

$$\phi = \int_{ocean\ bottom}^{pressure\ level} \delta(z)\,dp \quad (2)$$

where

ø=geopotential

δ=specific volume anomaly=$\alpha_{S,T,p} - \alpha_{35,0,p}$

α=specific volume=reciprocal of density computed at S, T, and p from an equation of state for seawater p=pressure dp=infinitesimal pressure difference z=depth at p Given T and S values at fixed levels, a vector $x^T = [T_1 \ldots T_N, S_1 \ldots S_N]$, where N is the number of vertical levels, can be defined. There can be a specific volume functional α, linearized about an initial temperature and salinity that operates on x. Also a linear functional operator G can be defined that provides a vertical integral from the reference depth to all depths and thus provides the geopotential at all depths. Thus the geopotential computed from the T and S vector is:

$$\phi = G\delta x \quad (3)$$

G is an N×N matrix, and δ is an N×2N matrix. The vector x can be extended by appending the geopotential at each depth so that $y^T = [x^T, \phi_1 \ldots \phi_N]$ so that the length of y is 3N. If the covariance of x is defined as $UBU^T$ where U is the diagonal matrix containing the standard deviations of x and B is the cross correlation matrix, the covariance of y is then $$\langle (y - \langle y \rangle)(y - \langle y \rangle)^T \rangle = \begin{bmatrix} UBU^T & UBU^T \delta^T G^T \\ G\delta UBU^T & G\delta UBU^T \delta^T G^T \end{bmatrix} \quad (4)$$

The vertical integration of specific volume anomaly is accomplished by the matrix G. If the ordering of T and S within x is the top of the water column in position 1 and the bottom of the water column in position N, and if pressures at the depths of the T, S, ø and δ are given by the vector $p^T$, the vertical integral can be expressed in a summation that computes a trapezoidal integration:

$$\phi_i = \sum_{j=N}^{i+1} \frac{(\delta_{j-1} + \delta_j)}{2}(p_j - p_{j-1}) \quad (5)$$

Thus $\phi_i$ is given by:

$$\phi_i^T = \left[0, 0, 0, \ldots, \delta_i \frac{p_{i+1} - p_i}{2}, \right.\\
\delta_{i+1} \frac{(p_{i+2} - p_{i+1}) + (p_{i+1} - p_i)}{2}, \ldots, \delta_k \frac{(p_{k+1} - p_k) + (p_k - p_{k-1})}{2}, \\
\ldots, \delta_N \frac{p_N - p_{N-1}}{2}\right] = \left[0, 0, 0, \ldots, \delta_i \frac{p_{i+1} - p_i}{2}, \right.\\
\left. \delta_{i+1} \frac{p_{i+2} - p_i}{2}, \ldots, \delta_k \frac{p_{k+1} - p_{k-1}}{2}, \ldots, \delta_N \frac{p_N - p_{N-1}}{2}\right] \quad (6)$$

The coefficients of pressure for each $\delta_i$ are the elements of the G matrix. In the case of $\phi_i$ for i=N, $G_i$ is a null vector since the geopotential anomaly at the reference level is zero. This is a simplifying assumption as an initial step, i.e. assuming the model background solution below the reference depth is correct.

The covariance for T and S is based on the Improved Synthetic Ocean Profile (ISOP, Helber et al., ISOP VTR NRL formal report, submitted 2013) that provides the matrix B of equation (4). The extension here is provided by appending the geopotential covariance based on equation (6).

Figure 1:
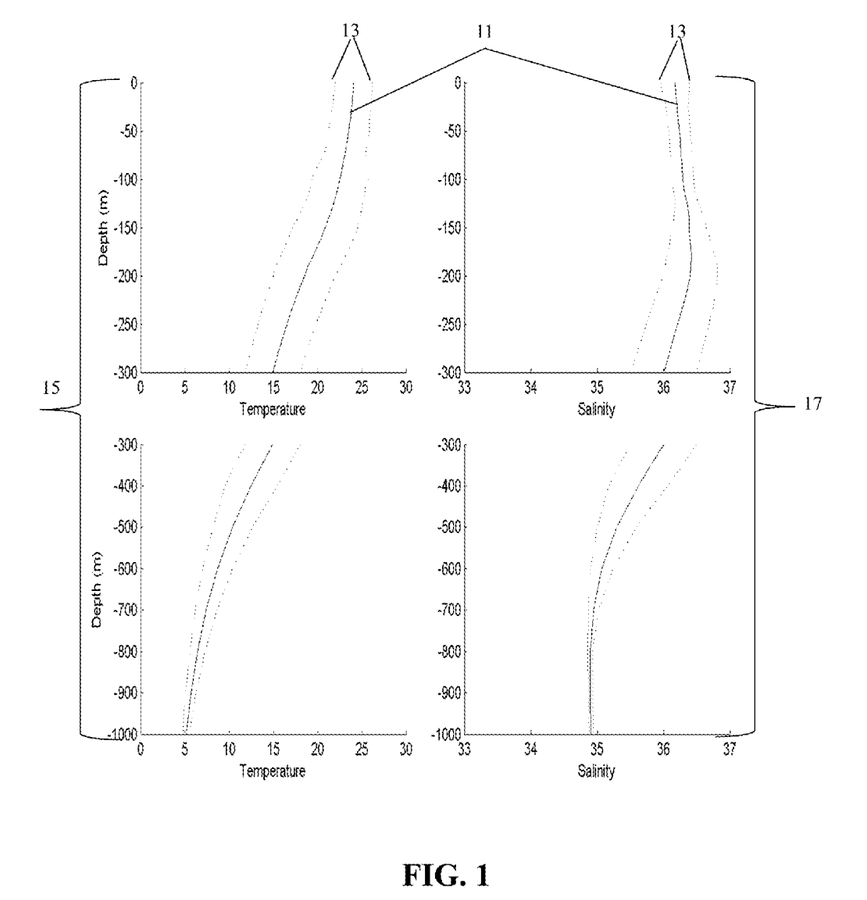
FIG. 1 is a graphical representation of the long term mean during January of T and S at 275° E, 24° N.

Referring now to FIG. 1, an example of the vertical covariance structure is provided during January at 275° E, 24° N. The vertical scale is separated into two portions to better show the upper water column. The vertical structure of mean 11 and one standard deviation 13 of temperature 15 and salinity 17 are shown. Mean 11 is based on all historical in situ data taken during January. Each month has an equivalently constructed set of information on the mean and variances information. The location, 275° E, 24° N, is northeast of Cuba in the Gulf of Mexico. Salinity 17 shows the characteristic subsurface maximum at about 200 m depth. Mean 11 is subtracted from historical in situ data, and the cross correlation between T and S at all depths is constructed. This provides the B matrix at every latitude and longitude point. The B matrix is decomposed through an eigenvalue decomposition to produce $B = \Gamma \Lambda \Gamma^T$ where $\Gamma$ is the matrix of eigenvectors and $\Lambda$ is a diagonal matrix of eigenvalues. To significantly reduce the data storage requirements, the most significant eigenvectors are computed and stored. In an exemplary embodiment, temperature and salinity are stored at forty-seven standard depths. In this example, to fully store B would require 47×47 values at every latitude and longitude. If the most significant eigenvectors are retained up to a maximum of six, storage requirements can be reduced by a factor of eight. Choosing the most significant eigenvectors does not fundamentally change the derivation of the cross covariance matrix between T, S, and ϕ in equation (4), but it does change how the information is formulated and stored. For example, the term in equation (4)

$$G\alpha UBU^T\alpha^T G^T = G\alpha U\Gamma\Lambda\Gamma^T U^T\alpha^T G^T \quad (7)$$

is stored as the vertical pressure integration and specific volume anomaly operating on the T and S eigenvectors:

$$G\alpha\Gamma \quad (8)$$

which is possible since the standard deviation matrix U is diagonal. Thus the cross correlation matrix between T, S and ϕ can be reconstructed based on stored eigenvectors and eigenvalues.

Figure 2:
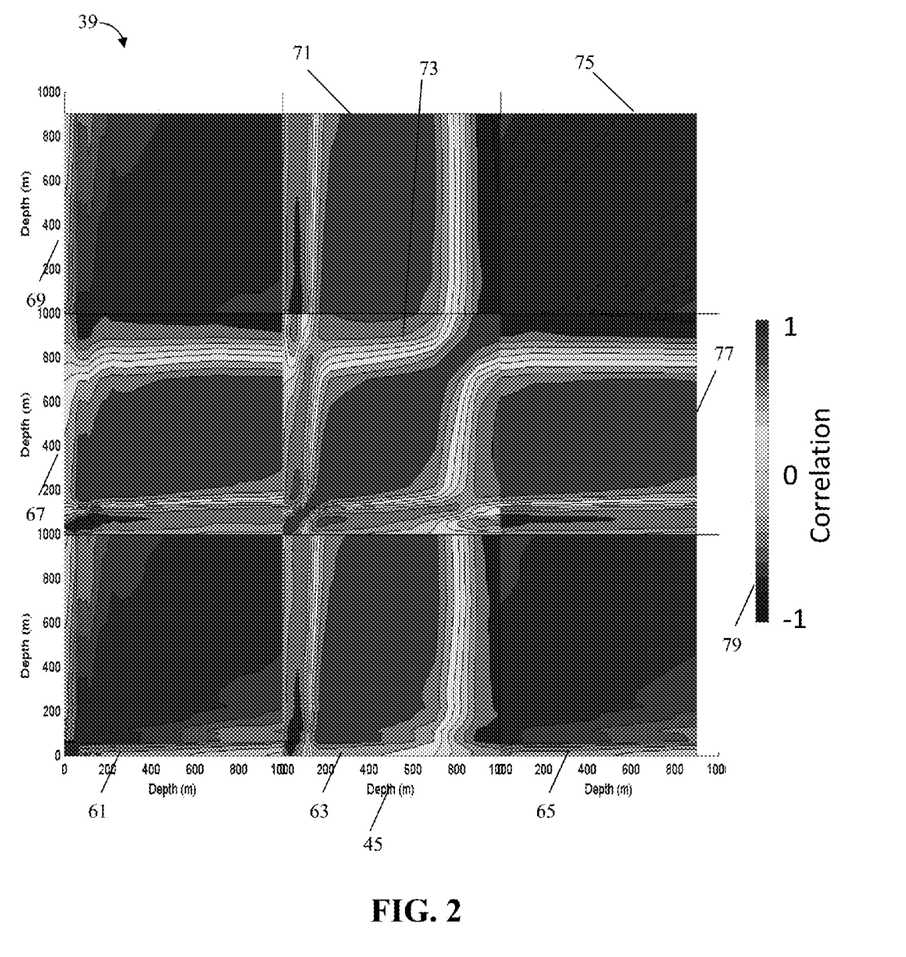
FIG. 2 is a graphical representation of the cross correlation of T, S and φ at 275° E, 24° N for January.

Referring now to FIG. 2, cross correlation matrix 39 at 275° E, 24° N for January is shown computed from the eigenvector and eigenvalue information stored in the ISOP data files. In the exemplary embodiment, each month of the year can be stored as a separate file, and the eigen information can be stored on a 0.5° grid covering the globe. Correlation scale 79 is shown as a color bar range from −1 (blue) to +1(red). Cross correlation matrix 39 includes T-T cross correlation 61, T-S cross correlation 63, T-ϕ cross correlation 65, S-T cross correlation 67, S-S cross correlation 73, S-ϕ cross correlation 77, ϕ-T cross correlation 69, ϕ-S cross correlation 71, and ϕ-ϕ cross correlation 75. Cross correlation matrix 39 provides the relationship between any of the three variables T, S and ϕ at any depth 45. Thus, given one variable at a particular depth 45, it is straightforward to determine the correlation to any other variable at any other depth 45.

Figure 3:
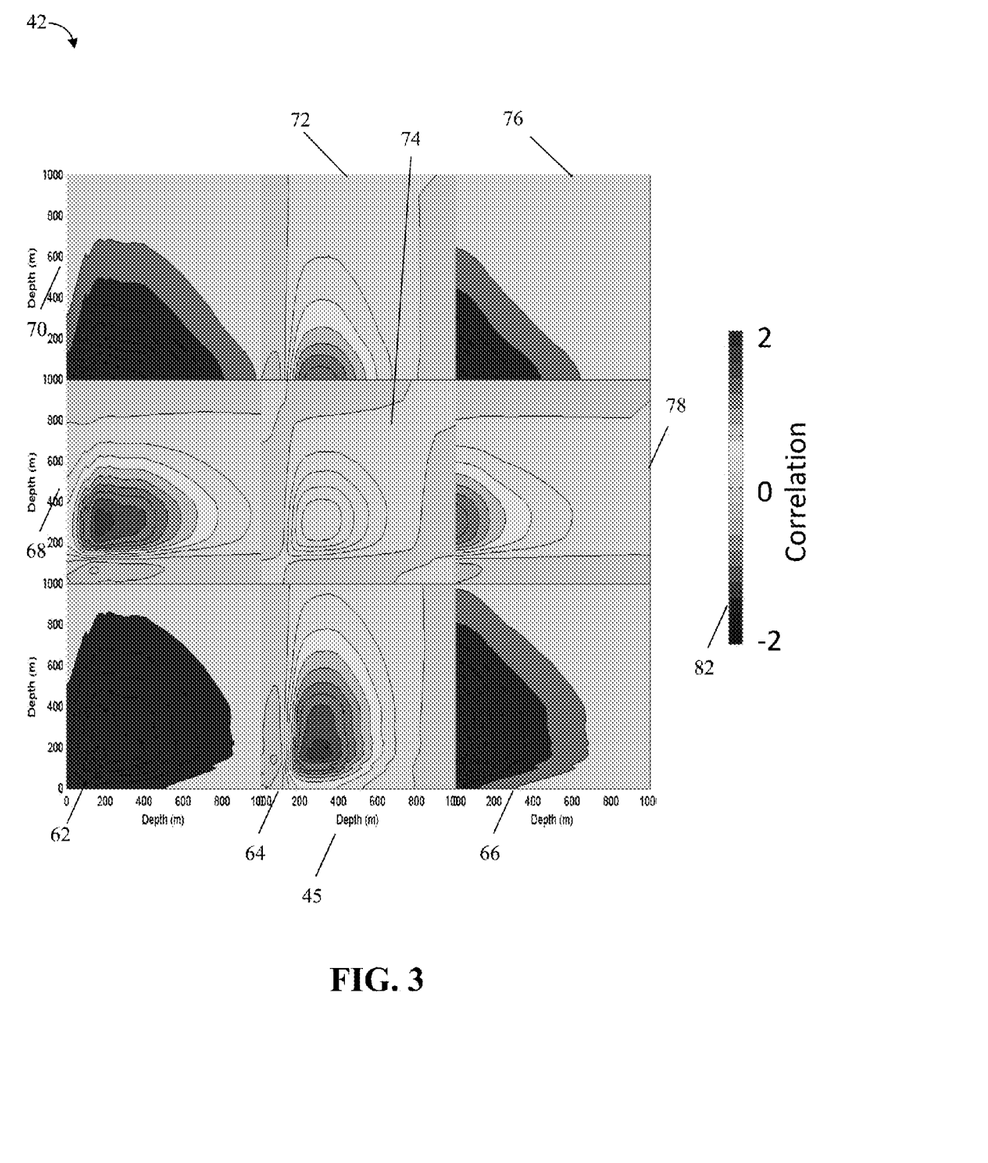
FIG. 3 is a graphical representation of the cross covariance of T, S and φ computed from correlation using the standard deviation matrix U at 275° E, 24° N for January.

Referring now to FIG. 3, covariance matrix 42 at 275° E, 24° N for January has been reconstructed given the standard deviation matrix U that can be, for example, but not limited to, stored in the same data files as the eigenmode information. The covariance is the correlation multiplied by the standard deviation of both variables. Correlation scale 82 is shown as a color bar range from −2 (blue) to +2 (red). Covariance matrix 42 includes T-T cross covariance 62, T-S cross covariance 64, T-ϕ cross covariance 66, S-T cross covariance 68, S-S cross covariance 74, S-ϕ cross covariance 78, ϕ-T cross covariance 70, ϕ-S cross covariance 72, and ϕ-ϕ cross covariance 76. Covariance matrix 42 provides the relationship between any of the three variables T, S and ϕ at any depth 45. Thus, given one variable at a particular depth 45, it is straightforward to determine the correlation to any other variable at any other depth 45.

Figure 4A:
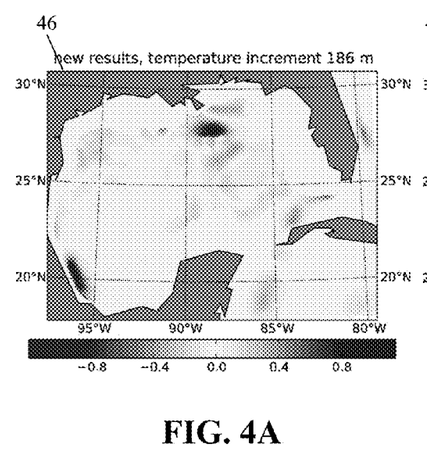
FIG. 4A is a graphical representation of corrections available with the use of SSH observations.
Figure 4B:
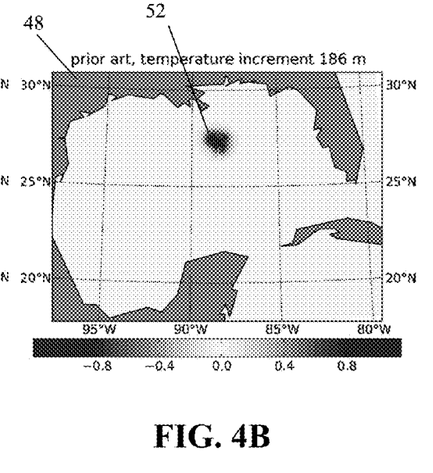
FIG. 4B is a graphical representation of corrections available without the use of SSH observations.

Referring now to FIGS. 4A and 4B, temperature increments at 186 meters depth in the Gulf of Mexico for a data assimilative ocean circulation numerical model are shown. The increments represent the correction applied to the model during a data assimilation cycle. Chart 46 shows correlations created with the system and method of the present embodiment that are used to relate SSH observations with subsurface T, S, and ϕ. The same correlations are also used to relate T observations with T, S, and ϕ at other vertical location in the ocean. Chart 48 shows a prior method for data assimilation that only produces model temperature corrections at 186 meters depth near subsurface profile observations. Spot 52 is a location (approximately 27.5° N, 89° W) where subsurface profiles were assimilated. Model corrections from SSH and surface T observations do not create model corrections at 186 m in the prior method for data assimilation. The existence of more model corrections in chart 46 indicates that a more accurate model forecast can be produced using the system and method of the present embodiment.

Figure 5:
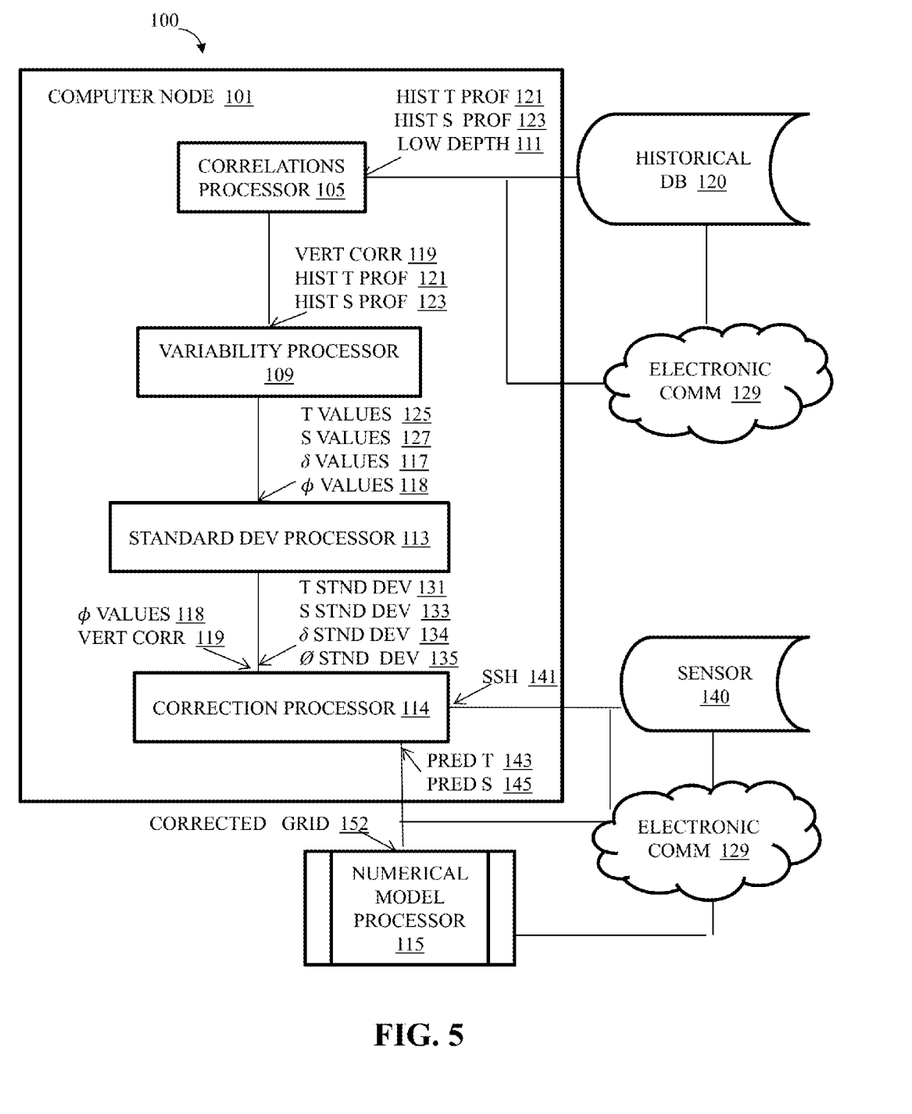
FIG. 5 is a schematic block diagram of the system of the present embodiment.

Referring now to FIG. 5, computer system 100 executing on special purpose computer node 101 for correcting a grid of predicted ocean temperature and predicted ocean salinity based on sea surface height observations 141 can include, but is not limited to including, correlations processor 105 computing, by special purpose computer 101, vertical correlations 119 between historical temperature values 125 and historical salinity values 127 at various depths. Historical temperature values 125 are part of historical temperature vertical profiles 121, and are found at various depths in historical temperature vertical profiles 121. Historical salinity values 127 are part of historical salinity vertical profiles 123, and are found at various depths. The various depths are chosen from a set of depths that span from pre-selected lowest depth 111 to the ocean surface. Historical temperature vertical profiles 121, historical salinity vertical profiles 123, and pre-selected depth 111 can be received directly from historical database 120, or through electronic communications 129. Computer system 100 can also include variability processor 109 computing, by special purpose computer 101, significant vertical variability of historical temperature vertical profiles 121 and significant vertical variability of the historical salinity vertical profiles 123 based on an empirical orthogonal function (EOF) analysis of historical temperature vertical profiles 121 and historical salinity vertical profiles 123. Variability processor 109 can also compute significant vertical variability of specific volume anomaly vertical profiles based on the significant vertical variability of temperature vertical profiles 121 and the significant vertical variability of historical salinity vertical profiles 123. The specific volume anomaly vertical profiles can include specific volume anomaly values 117 which are computed from historical temperature values 125 and historical salinity values 127 through an equation of motion for sea water. Variability processor 109 can also compute significant vertical variability of geopotential vertical profiles based on the significant vertical variability of the specific volume anomaly vertical profiles. The geopotential vertical profiles can include geopotential values 118. Computer system 100 can still further include standard deviation processor 113 computing, by special purpose computer 101, temperature standard deviations 131 of historical temperature values 125 and salinity standard deviations 133 of historical salinity values 127. Standard deviation processor 113 can also compute specific volume anomaly standard deviations 134 of specific volume anomaly values 117 based on temperature standard deviations 131 and the salinity standard deviations 133. Standard deviation processor 113 can compute geopotential standard deviation 135 of geopotential values 118 based on specific volume anomaly standard deviations 134. System 100 can also include correction processor 114 modifying, by special purpose computer 101, geopotential values 118 to incorporate sea surface height (SSH) observations 141 at the ocean surface. SSH 141 can be received, for example, either directly from sensor 140 or indirectly through electronic communications 129. Correction processor 114 can compute covariances based on vertical correlations 119, temperature standard deviations 131, salinity standard deviations 133, and geopotential standard deviations 135. Corrections processor 114 can create corrected temperature and salinity grid 152 based on predicted ocean temperature 143, predicted ocean salinity 145, the covariances, and the modified geopotential values.

Specific volume anomaly value 117 at depth z can optionally be computed as $$\delta(z) = \alpha_{S,T,p} - \alpha_{35,0,p}$$

where S=salinity values 127, T=temperature values 125, p=pressure, α=specific volume values=reciprocal of density computed at S, T, and p from an equation of state for seawater, z=depth at p, and δ(z)=specific volume anomaly 117 at z. Geopotential values 118 can optionally be computed as $$\phi = \int_{ocean\ bottom}^{pressure\ level} \delta(z)\, dp$$

where ø=geopotential and dp=infinitesimal pressure difference. The covariances can optionally be computed as $$\langle (y - \langle y \rangle)(y - \langle y \rangle)^T \rangle = \begin{bmatrix} UBU^T & UBU^T \delta^T G^T \\ G\delta UBU^T & G\delta UBU^T \delta^T G^T \end{bmatrix}$$

where $y^T = [T_1 \ldots T_N, S_n, \ldots \phi_1 \ldots \phi_N]$, < >=average operator, U=vector of standard deviations for T and S, B=correlation matrix for T or S, ø=Gδx, x=[$T_1 \ldots T_N$, $S_1 \ldots S_N$], and G=linear functional operator (N×N matrix) providing a vertical integral from a pre-selected ocean depth 111 to the ocean surface. Corrections processor 114 can optionally include computer code producing a matrix of eigenvectors based on decomposing vertical correlations 119 through eigenvalue decomposition, storing a set of most significant eigenvectors of the matrix of eigenvectors, the set being sized up to a pre-selected value, and reconstructing vertical correlations 119 based on the set of most significant eigenvectors, temperature standard deviations 131, salinity standard deviations 133, and geopotential standard deviations 135. The pre-selected value can optionally be 6. System 100 can optionally include numerical model processor 115 executing a numerical ocean prediction model using corrected grid 152 to produce a numerical model forecast. The numerical ocean prediction model can optionally predict locations of eddies based on the numerical model forecast and locations and strengths of ocean gradients based on the numerical model forecast, and can optionally provide mission management based on the predicted locations and strengths of ocean gradients.

Figure 6A:
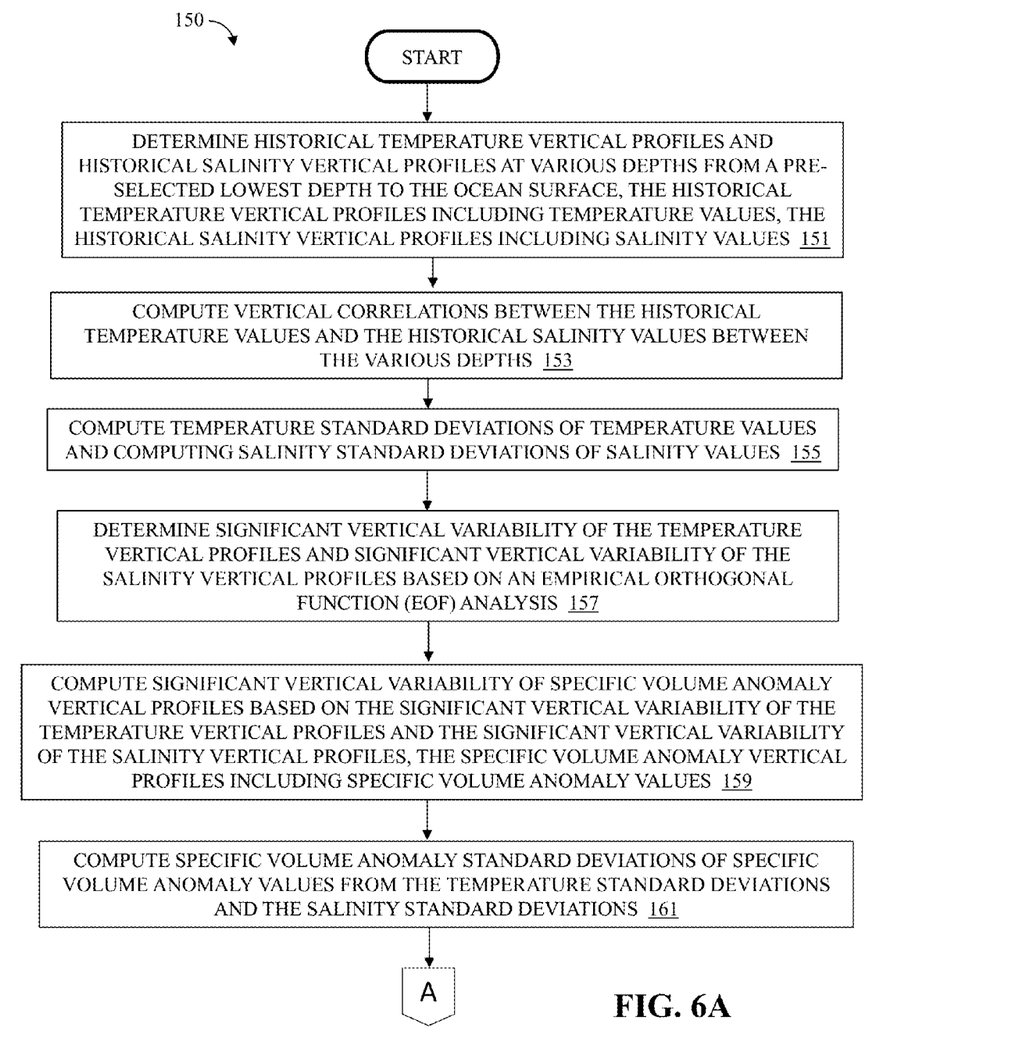
FIGS. 6A and 6B are flowcharts of the method of the present embodiment.
Figure 6B:
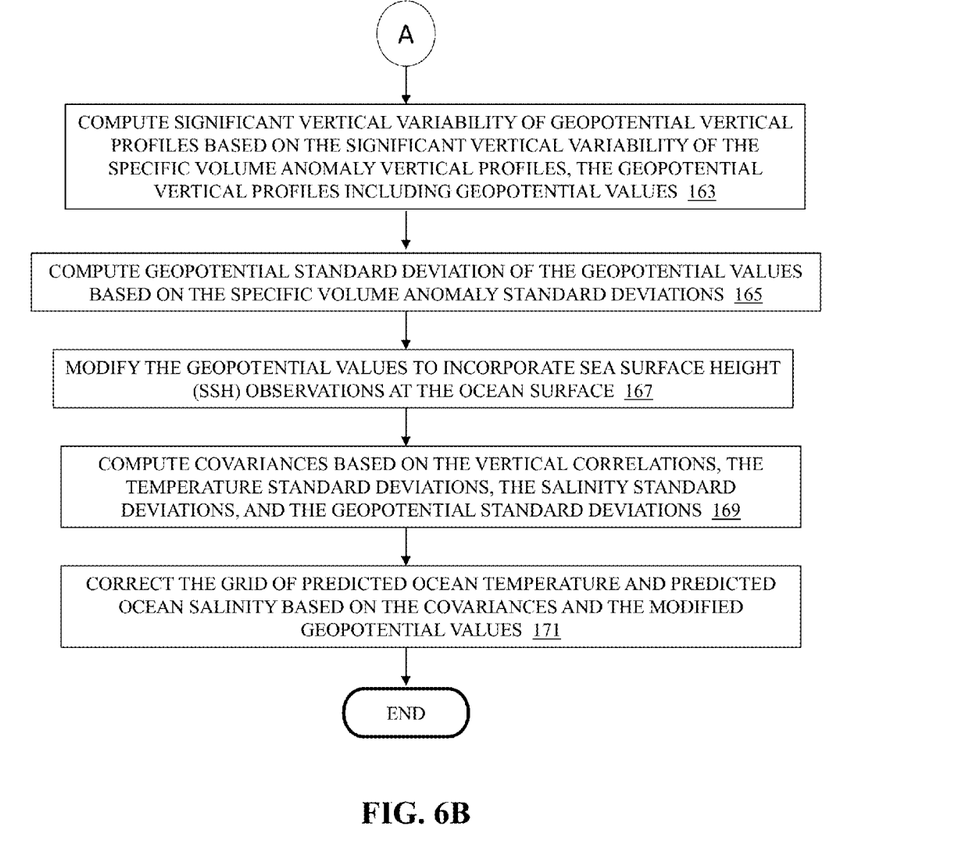

Referring now primarily to FIGS. 6A and 6B, method 150 (FIGS. 6A and 6B) for correcting a grid of predicted ocean temperature and ocean salinity based on sea surface height observations can include, but is not limited to including, determining 151 (FIG. 6A) historical temperature vertical profiles 121 (FIG. 5) and historical salinity vertical profiles 123 (FIG. 5) at various depths from a pre-selected lowest depth 111 (FIG. 5) to the ocean surface. Historical temperature vertical profiles 121 (FIG. 5) include historical temperature values 125 (FIG. 5), and historical salinity vertical profiles 123 (FIG. 5) include historical salinity values 127 (FIG. 5). Method 150 (FIGS. 6A and 6B) can also compute 153 (FIG. 6A), by special purpose computer 101 (FIG. 5), vertical correlations 119 (FIG. 5) between historical temperature values 125 (FIG. 5) and historical salinity values 127 (FIG. 5) between the various depths, and can compute 155 (FIG. 6A), by special purpose computer 101 (FIG. 5), temperature standard deviations 131 (FIG. 5) of historical temperature values 125 (FIG. 5) and salinity standard deviations 133 (FIG. 5) of historical salinity values 127 (FIG. 5). Method 150 (FIGS. 6A and 6B) can also determine 157 (FIG. 6A), by special purpose computer 101 (FIG. 5), significant vertical variability of historical temperature vertical profiles 121 (FIG. 5) and significant vertical variability of the historical salinity vertical profiles 123 (FIG. 5) based on an empirical orthogonal function (EOF) analysis. Method 150 (FIGS. 6A and 6B) can still further compute 159 (FIG. 6A), by special purpose computer 101 (FIG. 5), significant vertical variability of specific volume anomaly vertical profiles based on the significant vertical variability of historical temperature vertical profiles 121 (FIG. 5) and the significant vertical variability of historical salinity vertical profiles 123 (FIG. 5). The specific volume anomaly vertical profiles include specific volume anomaly values 117 (FIG. 5). Method 150 (FIGS. 6A and 6B) can compute 161 (FIG. 6A), by special purpose computer 101 (FIG. 5), specific volume anomaly standard deviations 134 (FIG. 5) of specific volume anomaly values 117 (FIG. 5) based on temperature standard deviations 131 (FIG. 5) and salinity standard deviations 133 (FIG. 5), and can computer 163 significant vertical variability of geopotential vertical profiles based on the significant vertical variability of specific volume anomaly vertical profiles. The geopotential vertical profiles include geopotential values 118 (FIG. 5). Method 150 (FIGS. 6A and 6B) can compute 165 (FIG. 6B), by special purpose computer 101 (FIG. 5), geopotential standard deviation 135 (FIG. 5) of geopotential values 118 (FIG. 5) based on specific volume anomaly standard deviations 134 (FIG. 5), and can modify 167 (FIG. 6B), by special purpose computer 101 (FIG. 5), geopotential values 118 (FIG. 5) to incorporate sea surface height (SSH) observations 141 (FIG. 5) at the ocean surface. Method 150 (FIGS. 6A and 6B) can compute 169 (FIG. 6B), by special purpose computer 101 (FIG. 5), covariances based on vertical correlations 119 (FIG. 5), temperature standard deviations 131 (FIG. 5), salinity standard deviations 133 (FIG. 5), and geopotential standard deviations 135 (FIG. 5), and can correct 171 (FIG. 6B), by special purpose computer 101 (FIG. 5), the grid of predicted ocean temperature 143 (FIG. 5) and predicted ocean salinity 145 (FIG. 5) computed by numerical model processor 115 (FIG. 5) based on the covariances and the modified geopotential values.

Method 150 (FIGS. 6A and 6B) can optionally produce a matrix of eigenvectors based on decomposing vertical correlations 119 (FIG. 5) through eigenvalue decomposition, store a set of most significant eigenvectors of the matrix of eigenvectors, the set being sized up to a pre-selected value, and reconstruct vertical correlations 119 (FIG. 5) based on the set of most significant eigenvectors, temperature standard deviations 131 (FIG. 5), salinity standard deviations 133 (FIG. 5), and geopotential standard deviations 135 (FIG. 5). Method 150 (FIGS. 6A and 6B) can optionally execute a numerical ocean prediction model using corrected grid 152 to produce a numerical model forecast, and predict location of eddies based on the numerical model forecast, or predict locations and strengths of ocean gradients based on the numerical model forecast, or provide mission management based on the predicted locations and strengths of ocean gradients.

Embodiments of the present teachings are directed to computer systems such as system 100 (FIG. 5) for accomplishing the methods such as method 150 (FIGS. 6A and 6B) discussed in the description herein, and to computer readable media containing programs for accomplishing these methods. The raw data and results can be stored for future retrieval and processing, printed, displayed, transferred to another computer, and/or transferred elsewhere. Communications links such as electronic communications 129 (FIG. 5) can be wired or wireless, for example, using cellular communication systems, military communications systems, and satellite communications systems. In an exemplary embodiment, the software for the system is written in FORTRAN and C. The system can operate on a computer having a variable number of CPUs. Other alternative computer platforms can be used. The operating system can be, for example, but is not limited to, LINUX®.

The present embodiment is also directed to software for accomplishing the methods discussed herein, and computer readable media storing software for accomplishing these methods. The various modules described herein can be accomplished on the same CPU, or can be accomplished on different computers. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Methods such as method 150 (FIGS. 6A and 6B) of the present embodiment can be, in whole or in part, implemented electronically. Signals representing actions taken by elements of the system and other disclosed embodiments can travel over at least one live communications network 129 (FIG. 5). Control and data information can be electronically executed and stored on at least one computer-readable medium. System 100 (FIG. 5) can be implemented to execute on at least one computer node in at least one live communications network 129 (FIG. 5). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. A computer method for correcting a grid of predicted ocean temperature and ocean salinity based on sea surface height observations comprising:
   determining historical temperature vertical profiles and historical salinity vertical profiles at various depths from a pre-selected lowest depth to an ocean surface, the historical temperature vertical profiles including temperature values, the historical salinity vertical profiles including salinity values;
   generating, by a special purpose computer, the grid of predicted ocean temperature and ocean salinity based on the historical temperature vertical profiles and the historical salinity vertical profiles;
   computing, by the special purpose computer, vertical correlations between the historical temperature values and the historical salinity values between the various depths;
   computing, by the special purpose computer, temperature standard deviations of temperature values and computing salinity standard deviations of salinity values;
   determining, by the special purpose computer, significant vertical variability of the temperature vertical profiles and significant vertical variability of the salinity vertical profiles based on an empirical orthogonal function (EOF) analysis;
   computing, by the special purpose computer, significant vertical variability of specific volume anomaly vertical profiles based on the significant vertical variability of the temperature vertical profiles and the significant vertical variability of the salinity vertical profiles, the specific volume anomaly vertical profiles including specific volume anomaly values;
   computing, by the special purpose computer, specific volume anomaly standard deviations of the specific volume anomaly values from the temperature standard deviations and the salinity standard deviations;
   computing, by the special purpose computer, significant vertical variability of geopotential vertical profiles based on the significant vertical variability of the specific volume anomaly vertical profiles, the geopotential vertical profiles including geopotential values;
   computing, by the special purpose computer, geopotential standard deviation of the geopotential values based on the specific volume anomaly standard deviations;
   receiving, by the special purpose computer, sea surface height (SSH) observations at the ocean surface directly from a satellite device;
   modifying, by the special purpose computer, the geopotential values of the geopotential vertical profiles to incorporate the SSH observations at the ocean surface;
   computing, by the special purpose computer, covariances based on the vertical correlations, the temperature standard deviations, the salinity standard deviations, and the geopotential standard deviations;
   correcting, by the special purpose computer, the grid of predicted ocean temperature and predicted ocean salinity based on the covariances and the modified geopotential values;
   executing a numerical ocean prediction model using the corrected grid of predicted temperature and predicted ocean salinity to produce an ocean forecast; and
   predicting location of eddies based on the ocean forecast.

2. The method as in claim 1 wherein the specific volume anomaly at depth z comprises:

$$\delta(z) = \alpha_{S,T,p} - \alpha_{35,0,p}$$

where S=salinity;
T=temperature;
p=pressure;
α=specific volume=reciprocal of density computed at S, T, and p from an equation of state for seawater;
z=depth at p;
δ(z)=specific volume anomaly at z.

3. The method as in claim 2 wherein the geopotential values comprise:

$$\phi = \int_{ocean\ bottom}^{pressure\ level} \delta(z)\, dp$$

where ø=geopotential
dp=infinitesimal pressure difference.

4. The method as in claim 1 wherein the covariances comprise:

$$\langle (y - \langle y \rangle)(y - \langle y \rangle)^T \rangle = \begin{bmatrix} UBU^T & UBU^T \delta^T G^T \\ G\delta UBU^T & G\delta UBU^T \delta^T G^T \end{bmatrix}$$

where $y^T = [T_1 \ldots T_N, S_1 \ldots S_n, \varnothing_1 \ldots \varnothing_N]$
< >=average operator;
U=vector of standard deviations for T and S;
B=correlation matrix for T or S;
ø=Gδx;
$x = [T_1 \ldots T_N, S_1 \ldots S_N]$;
G=linear functional operator (N×N matrix) providing a vertical integral from the ocean depth to the ocean surface.

5. The method as in claim 1 further comprising:
producing a matrix of eigenvectors based on decomposing the vertical correlations through eigenvalue decomposition;
storing a set of most significant eigenvectors of the matrix of eigenvectors, the set being sized up to a pre-selected value; and
reconstructing the vertical correlations based on the set of most significant eigenvectors, the temperature standard deviations, the salinity standard deviations, and the geopotential standard deviations.

6. The method as in claim 5 wherein the pre-selected value is 6.

7. The method as in claim 1 further comprising:
predicting locations and strengths of ocean gradients based on the ocean forecast.

8. The method as in claim 1 further comprising:
predicting locations and strengths of ocean gradients based on the ocean forecast; and
providing mission management based on the predicted locations and strengths of ocean gradients.

9. A computer system for correcting a grid of predicted ocean temperature and ocean salinity in a water column based on sea surface height observations comprising:
a correlations processor configured to:
generate, by a special purpose computer, the grid of predicted ocean temperature and ocean salinity based on historical temperature vertical profiles and historical salinity vertical profiles; and
compute, by the special purpose computer, vertical correlations between the historical temperature values and the historical salinity values at various depths, the historical temperature values being part of historical temperature vertical profiles having historical temperature values at the various depths, the historical salinity values being part of historical salinity vertical profiles having historical salinity values at the various depths, the various depths being from a pre-selected lowest depth to an ocean surface;
a variability processor configured to compute, by the special purpose computer, significant vertical variability of the temperature vertical profiles and significant vertical variability of the salinity vertical profiles based on an empirical orthogonal function (EOF) analysis of the historical temperature vertical profiles and the historical salinity vertical profiles, the variability processor computing significant vertical variability of specific volume anomaly vertical profiles based on the significant vertical variability of the temperature vertical profiles and the significant vertical variability of the salinity vertical profiles, the specific volume anomaly vertical profiles including specific volume anomaly values, the variability processor computing significant vertical variability of geopotential vertical profiles based on the significant vertical variability of specific volume anomaly vertical profiles, the geopotential vertical profiles including geopotential values;
a standard deviation processor configured to compute, by the special purpose computer, temperature standard deviations of temperature values and computing salinity standard deviations of salinity values, the standard deviation processor computing specific volume anomaly standard deviations of the specific volume anomaly values based on the temperature standard deviations and the salinity standard deviations, the standard deviation processor computing geopotential standard deviation of the geopotential values based on the specific volume anomaly standard deviations;
a correction processor configured to:
receive, by the special purpose computer, sea surface height (SSH) observations at the ocean surface directly from a satellite device;
modify, by the special purpose computer, the geopotential values of the geopotential vertical profiles to incorporate sea surface height (SSH) observations at the ocean surface, the correction processor computing covariances based on the vertical correlations, the temperature standard deviations, the salinity standard deviations, and the geopotential standard deviations, the corrections processor correcting the grid of predicted ocean temperature and predicted ocean salinity based on the covariances and the modified geopotential values; and
a numerical model processor configured to execute a numerical ocean prediction model using the corrected predicted temperature and the corrected predicted salinity to produce an ocean forecast, the numerical ocean prediction model predicting locations of eddies based on the ocean forecast.

10. The system as in claim 9 wherein the specific volume anomaly at depth z comprises:

$$\delta(z) = \alpha_{S,T,p} - \alpha_{35,0,p}$$

where S=salinity;
T=temperature;
p=pressure;

α=specific volume=reciprocal of density computed at S, T, and p from an equation of state for seawater;

z=depth at p;

δ(z)=specific volume anomaly at z.

11. The system as in claim 9 wherein the geopotential values comprise:

$$\phi = \int_{ocean\ bottom}^{pressure\ level} \delta(z)\, dp$$

where ø=geopotential dp=infinitesimal pressure difference.

12. The system as in claim 10 wherein the covariances comprise:

$$\langle (y - \langle y \rangle)(y - \langle y \rangle)^T \rangle = \begin{bmatrix} UBU^T & UBU^T \delta^T G^T \\ G\delta UBU^T & G\delta UBU^T \delta^T G^T \end{bmatrix}$$

where $y^T = [T_1 \ldots T_N, S_1 \ldots S_n, \emptyset_1 \ldots \emptyset_N]$;

< >≡average operator;

U=vector of standard deviations for T and S;

B=correlation matrix for T or S;

ø=Gδx;

x=$[T_1 \ldots T_N, S_1 \ldots S_N]$;

G=linear functional operator (N×N matrix) providing a vertical integral from the ocean depth to the ocean surface.

13. The system as in claim 9 wherein the corrections processor further comprises:

computer code producing a matrix of eigenvectors based on decomposing the vertical correlations through eigenvalue decomposition, storing a set of most significant eigenvectors of the matrix of eigenvectors, the set being sized up to a pre-selected value, and reconstructing the vertical correlations based on the set of most significant eigenvectors, the temperature standard deviations, the salinity standard deviations, and the geopotential standard deviations.

14. The system as in claim 13 wherein the pre-selected value is 6.

15. The system as in claim 9 further comprising:

a numerical model processor predicting locations and strengths of ocean gradients based on the ocean forecast.

16. The system as in claim 9 further comprising:

a numerical model processor predicting locations and strengths of ocean gradients based on the ocean forecast, the numerical ocean prediction model providing mission management based on the predicted locations and strengths of ocean gradients.

17. A system for correcting a grid of predicted ocean temperature and ocean salinity based on sea surface height observations comprising:

a sensor device configured to:
 measure sea surface height (SSH) observations at the ocean surface, and
 transmit the SSH observations; and a special purpose computer device in communication with the sensor device, wherein the special purpose computer device is configured to:
 receive the SSH observations;
 determine historical temperature vertical profiles and historical salinity vertical profiles at various depths from a pre-selected lowest depth to an ocean surface, the historical temperature vertical profiles including temperature values, the historical salinity vertical profiles including salinity values;
 generate the grid of predicted ocean temperature and ocean salinity based on the historical temperature vertical profiles and the historical salinity vertical profiles;
 compute vertical correlations between the historical temperature values and the historical salinity values between the various depths;
 compute temperature standard deviations of temperature values and salinity standard deviations of salinity values;
 determine significant vertical variability of the temperature vertical profiles and significant vertical variability of the salinity vertical profiles based on an empirical orthogonal function (EOF) analysis;
 compute significant vertical variability of specific volume anomaly vertical profiles based on the significant vertical variability of the temperature vertical profiles and the significant vertical variability of the salinity vertical profiles, the specific volume anomaly vertical profiles including specific volume anomaly values;
 compute specific volume anomaly standard deviations of the specific volume anomaly values from the temperature standard deviations and the salinity standard deviations;
 compute significant vertical variability of geopotential vertical profiles based on the significant vertical variability of the specific volume anomaly vertical profiles, the geopotential vertical profiles including geopotential values;
 compute geopotential standard deviation of the geopotential values based on the specific volume anomaly standard deviations;
 modify the geopotential values of the geopotential vertical profiles to incorporate the SSH observations at the ocean surface;
 compute covariances based on the vertical correlations, the temperature standard deviations, the salinity standard deviations, and the geopotential standard deviations;
 correct the grid of predicted ocean temperature and predicted ocean salinity based on the covariances and the modified geopotential values;
 execute a numerical ocean prediction model using the corrected grid of predicted temperature and predicted ocean salinity to produce an ocean forecast; and
 predict locations of eddies based on the ocean forecast.

18. The system of claim 17, wherein the sensor is a satellite device.

19. The system of claim 18, wherein the satellite device comprises an altimeter, and wherein the satellite is configured to measure the SSH observations using the altimeter.

20. The system of claim 18, wherein the satellite device comprises an altimeter configured to measure respective round-trip travel times of radar pulses, and wherein the satellite is configured to measure the SSH observations based on the measured round-trip travel time of the respective radar pulses.

* * * * *